(12) United States Patent
Perkins et al.

(10) Patent No.: US 7,793,098 B2
(45) Date of Patent: Sep. 7, 2010

(54) PROVIDING PRIVACY TO NODES USING MOBILE IPV6 WITH ROUTE OPTIMIZATION

(75) Inventors: Charles E. Perkins, Saratoga, CA (US); Rajeev Koodli, Sunnyvale, CA (US); Vijay Devarapalli, Santa Clara, CA (US); Hannu Flinck, Helsinki (FI)

(73) Assignee: Nokia Corporation, Espoo (FI)

( * ) Notice: Subject to any disclaimer, the term of this patent is extended or adjusted under 35 U.S.C. 154(b) by 1340 days.

(21) Appl. No.: 10/443,125

(22) Filed: May 20, 2003

(65) Prior Publication Data

US 2004/0236937 A1 Nov. 25, 2004

(51) Int. Cl.
*H04L 29/06* (2006.01)
(52) U.S. Cl. .................................... 713/160
(58) Field of Classification Search ............... None
See application file for complete search history.

(56) References Cited

U.S. PATENT DOCUMENTS

| | | | | |
|---|---|---|---|---|
| 6,055,236 A * | 4/2000 | Nessett et al. | ............ | 370/389 |
| 6,195,705 B1 * | 2/2001 | Leung | ............ | 709/245 |
| 6,452,920 B1 * | 9/2002 | Comstock | ............ | 370/349 |
| 6,636,498 B1 * | 10/2003 | Leung | ............ | 370/338 |
| 6,839,350 B1 * | 1/2005 | Inouchi et al. | ............ | 370/392 |
| 6,842,456 B1 * | 1/2005 | Chen et al. | ............ | 370/401 |
| 6,947,401 B2 * | 9/2005 | El-Malki et al. | ............ | 370/331 |
| 7,191,226 B2 * | 3/2007 | Flykt et al. | ............ | 709/218 |
| 7,380,124 B1 * | 5/2008 | Mizell et al. | ............ | 713/171 |
| 2001/0014917 A1 * | 8/2001 | Ishiyama et al. | ............ | 709/227 |
| 2001/0046223 A1 * | 11/2001 | Malki et al. | ............ | 370/338 |
| 2002/0069278 A1 * | 6/2002 | Forslow | ............ | 709/225 |
| 2002/0133607 A1 * | 9/2002 | Nikander | ............ | 709/229 |
| 2002/0152380 A1 * | 10/2002 | O'Shea et al. | ............ | 713/170 |
| 2003/0002468 A1 * | 1/2003 | Khalil et al. | ............ | 370/338 |
| 2003/0018810 A1 * | 1/2003 | Karagiannis et al. | ............ | 709/238 |
| 2003/0053453 A1 * | 3/2003 | Ono et al. | ............ | 370/389 |
| 2003/0161287 A1 * | 8/2003 | Venkitaraman et al. | ............ | 370/338 |
| 2003/0185198 A1 * | 10/2003 | Ishiyama et al. | ............ | 370/351 |
| 2004/0010683 A1 * | 1/2004 | Huitema | ............ | 713/162 |

(Continued)

OTHER PUBLICATIONS

H. Soliman et al., "Hierarchical Mobile IPv6 Mobility Management (HMIPv6)", Internet Draft, Internet Engineering Task Force, Oct. 2002, pp. 11-17.*

(Continued)

*Primary Examiner*—Emmanuel L Moise
*Assistant Examiner*—Nadia Khoshnoodi
(74) *Attorney, Agent, or Firm*—Mintz, Levin, Cohn, Ferris, Glovsky, and Popeo, P.C.

(57) ABSTRACT

The present invention provides location privacy against third parties while allowing route-optimized communication between the correspondent node and the mobile node. The mobile node's home address is hidden from an external observer thereby thwarting traffic analysis based attacks where a Home Address is correlated with a Care of Address of a mobile node (MN). A "privacy label" is used in place of a home address associated with the mobile node. The privacy label is supplied by the mobile node to the correspondent node in a way that that allows the privacy label to be bound to the home address, but does not allow the home address to be visible during the exchange. The privacy label may be also used to help prevent against replay attacks.

19 Claims, 6 Drawing Sheets

U.S. PATENT DOCUMENTS

2004/0202183 A1* 10/2004 Thubert et al. ......... 370/395.31

OTHER PUBLICATIONS

Fasbender et al., "Variable and Scalable Security: Protection of Location Information in Mobile IP," 1996, IEEE, pp. 963-964.*

D. Johnson et al., "Mobility Support in IPv6", Internet Draft, Internet Engineering Task Force, Oct. 29, 2002.

T. Narten et al. Privacy Extensions for Stateless Address Autoconfiguration in IPv6:, Request for Comments 3041, Internet Engineering Task Force, Jan. 2001.

J. Arkko et al., "Using IPsec to Protect Mobile IPv6 Signaling Between Mobile Nodes and Home Agents", Internet Draft, Internet Engineering Task Force, Oct. 15, 2002.

S. Thomson et al., "IPv6 Stateless Address Autoconfiguration", Request for Comments 2462, Internet Engineering Task Force, Dec. 1998.

H. Soliman et al., "Hierarchical Mobile IPv6 Mobility Management (HMIPv6)", Inernet Draft, Interent Engineering Task Force, Oct. 2002.

H. Krawczyk et al., "HMAC: Keyed-Hashing for Message Authentication", Request for Comments 2104, Internet Engineering Task Force, Feb. 1997.

S. Kent, et al., RFC 2406; IP Encapsulating Security Payload (ESP), Nov. 1998, pp. 1-21.

S. Kent, et al., RFC 2401; Security Architecture for the Internet Protocol, Nov. 1998, pp. 1-66.

* cited by examiner

PROVIDING PRIVACY TO NODES USING MOBILE IPV6 WITH ROUTE OPTIMIZATION

BACKGROUND OF THE INVENTION

A concern has been raised in the IPv6 community about the privacy and anonymity of an IP level session. In order for IP level connectivity to work, the connection end points need to be unequivocally identified by unique IP addresses that reflect the topological location of the end points on the Internet. The route aggregation and network hierarchy, and therefore routing efficiency, mandate that addresses must be arranged so that subnetworks share common prefixes (typically 64 bits) and interfaces of hosts or nodes are differentiated with a suffix part, also called Interface Identifier (IID). The IPv6 autoconfiguration process specifies how such addresses can be constructed in a stateless manner. In this process, routers advertise their prefixes on a subnet, or link. The hosts append the advertised prefix with a suffix that is derived, for instance, from 48-bit IEEE 802 MAC address. This MAC address is intended to be unique. This implies that in theory one could trace the whereabouts of a host, just by monitoring the IID, thus creating a privacy concern.

This has been a motivation for RFC 3041 that complements the IPv6 stateless address autoconfiguration with a method where a node gains in addition to embedded IEEE identifier, a random interface identifier that changes over the time. A random and changing interface identifier makes eavesdropping and tracing of identity difficult and perhaps sufficiently addresses the privacy problem.

If a node wishes to be reachable for other nodes, it needs to publish its identity (name) and IP address through DNS. Dynamically changing addresses as suggested in RFC 3041 without updating the respective DNS entries would obsolete the DNS entries and the node would be isolated from its peers. If the node updates the DNS entries dynamically, the attacker or data collector could easily correlate the node's identity with the randomly varying suffix part that is required to be in effect at least during the session by a straightforward DNS lookup or with an inverse lookup. The attacker can use this kind of a DNS lookup as a vehicle for such tracking.

Many services require inverse DNS lookups for weak authentication. Therefore changing the DNS entry during an active session would exclude these services. As can be seen, the requirement for privacy and anonymity comes with a price of generating periodically new interface identifiers, added house keeping and exclusion of some services.

SUMMARY OF THE INVENTION

The present invention is directed at providing location privacy against third parties while allowing route-optimized communication between the correspondent node and the mobile node.

According to one aspect of the invention, the mobile node's home address is hidden from an external observer thereby thwarting traffic analysis based attacks where a Home Address is correlated with a Care of Address of a mobile node (MN).

According to another aspect of the invention, a "privacy label" is used in place of a home address associated with the mobile node. The privacy label is supplied by the mobile node to the correspondent node in a way that that allows the privacy label to be bound to the home address, but does not allow the home address to be visible during the exchange.

According to another aspect of the invention, the privacy label may be used within a modified routing header. This avoids the use of a clear text home address for packets sent to the mobile node's care-of address. Similarly, the mobile node can use the privacy label within a modified Home Address Option, to identify its desired home address to the correspondent node without public disclosure.

According to yet another aspect of the invention, the privacy label is supplied by the mobile node to the correspondent node within an extension to the Binding Update to the correspondent node. A MN signals its intention to use a privacy label instead of using a clear text Home Address.

According to another aspect, the privacy label is a message authentication code XOR'd with a string where the string is the home address concatenated with the current care of address.

According to still yet another aspect of the invention, the privacy label helps to prevent replay attacks. A sequence number is included within the privacy label that is used by the nodes to determine if the message is valid.

According to one aspect of the invention, the method can be implemented with very minor changes to the base line mobile IPv6 specification. The change extends the specification and is backwards compatible with the current implementations.

DETAILED DESCRIPTION OF THE PREFERRED EMBODIMENT

Figure 1:
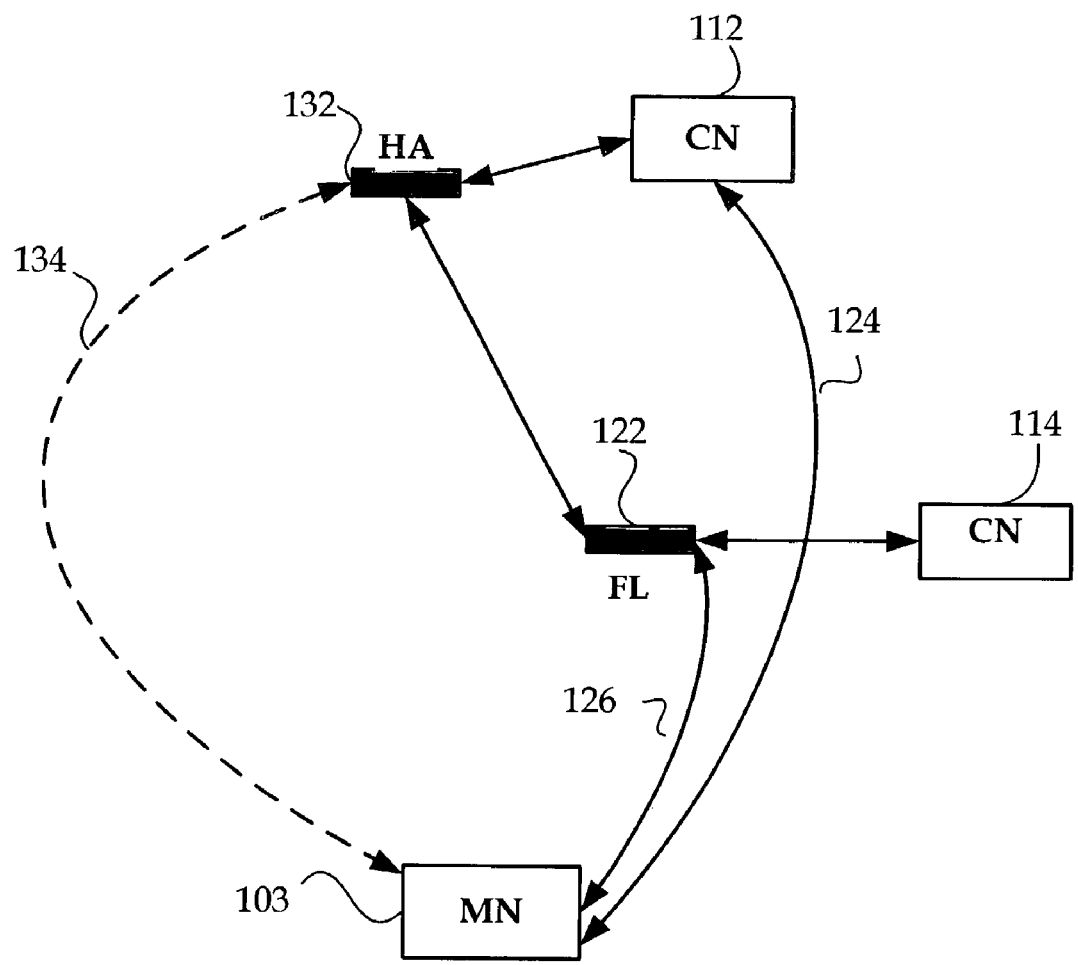
FIG. 1 illustrates an exemplary mobile IP network in which the invention may operate.

In the following detailed description of exemplary embodiments of the invention, reference is made to the accompanied drawings, which form a part hereof, and which is shown by way of illustration, specific exemplary embodiments of which the invention may be practiced. Each embodiment is described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise.

The term "IP" means any type of Internet Protocol.

The term "node" means a device that implements IP.

The term "router" means a node that forwards IP packets not explicitly addressed to itself.

The term "routable address" means an identifier for a network interface such that IP can send a packet to the interface identified by that address.

The term "link" means a communication facility or medium over which nodes can communicate.

The term "home link" means the link pointed to by a mobile node's home address.

The term "foreign link" means any link other than the mobile node's home link.

The term "mobile node" means a node that can change its point of attachment from one link to another, while still being reachable via its home address.

The term "correspondent node" means a peer node with which a mobile node is communicating. The correspondent node may be either mobile or stationary.

The term "home agent" means a router on a mobile node's home link with which the mobile node has registered its current care-of address. While the mobile node is away from home, the home agent intercepts packets on the home link destined to the mobile node's home address, encapsulates them, and tunnels them to the mobile node's registered care-of address.

The term "binding" means the association of the home address of a mobile node with a care-of address for that mobile node, along with the remaining lifetime of that association.

The term "home address" is an IP address assigned to the mobile node within its home subnet prefix on its home link.

The term "care-of address" is an IP address associated with a mobile node that has the subnet prefix of a particular foreign link.

Referring to the drawings, like numbers indicate like parts throughout the views. Additionally, a reference to the singular includes a reference to the plural unless otherwise stated or is inconsistent with the disclosure herein.

FIG. 1 illustrates an exemplary mobile IP network in which the invention may operate, in accordance with aspects of the invention. As shown in the figure, mobile node 103 is away from its home area and is now connected to a foreign link. To establish connectivity at its current location, mobile node 103 connects to the IP network through foreign link 122 with wireless connection 124.

Communications between mobile node 103 and correspondent nodes 112 and 114 may route through home agent 132 or may route directly between MN 103 and CN 114.

After the communication is authenticated and authorized, correspondent nodes 112 and 114 may send packets directly to mobile node 103 without going through home agent 132.

Mobile node 103 and a correspondent node (such as CN 114) may be configured to directly communicate. By implementing route optimization, packets may take a straightforward route between the mobile node and the correspondent node without being detoured through a home agent.

Mobile node 103 is expected to be addressable at its home address, whether it is currently attached to its home link or is away from home. While a mobile node is at home, packets addressed to its home address are routed to the mobile node's home link, using conventional Internet routing mechanisms.

While a mobile node is attached to foreign link 122 and is away from home, it may also be addressable at one or more care-of addresses. The mobile node can acquire its care-of address through conventional IPv6 mechanisms, such as stateless or stateful auto-configuration. As long as the mobile node stays in this location, packets addressed to this care-of address will be routed to the mobile node. The mobile node may also accept packets from several care-of addresses, such as when it is moving but still reachable at the previous link.

While away from home, a mobile node registers its primary care-of address with a router (HA 132) on its home link, requesting this router to function as the "home agent" for the mobile node. The mobile node performs this binding registration by sending a "Binding Update" message to the home agent. The home agent replies to the mobile node by returning a "Binding Acknowledgement" message. For a more detailed explanation, refer to D. Johnson, C. Perkins, J. Arkko. Mobility Support in IPv6 (work in progress). Internet Draft, Internet Engineering Task Force, 26 Feb. 2003.

Mobile node 103 can provide information about its current location to correspondent nodes 112 and 114. This happens through the correspondent binding procedure. As a part of this procedure, a return routability test is performed in order to authorize the establishment of the binding.

There are two possible modes for communications between the mobile node and a correspondent node. The first mode, bidirectional tunneling, does not require Mobile IPv6 support from the correspondent node and is available even if the mobile node has not registered its current binding with the correspondent node. Packets from the correspondent node are routed to the home agent and then tunneled to the mobile node. Packets to the correspondent node are tunneled from the mobile node to the home agent and then routed normally from the home network to the correspondent node. In this mode, the home agent uses proxy Neighbor Discovery to intercept any IPv6 packets addressed to the mobile node's home address(es) on the home link. Each intercepted packet is tunneled to the mobile node's primary care-of address. This tunneling is performed using IPv6 encapsulation.

In the second mode, "route optimization", the mobile node registers its current binding at the correspondent node. Packets from the correspondent node can be routed directly to the care-of address of the mobile node. When sending a packet to any IPv6 destination, the correspondent node checks its cached bindings for an entry for the packet's destination address. If a cached binding for this destination address is found, the node uses a new type of IPv6 routing header to route the packet to the mobile node by way of the care-of address indicated in this binding.

Routing packets sent directly to the mobile node's care-of address allows optimized communications paths to be used. It also eliminates congestion at the mobile node's home agent and home link. In addition, the impact of any possible failure of the home agent or networks on the path to or from it is reduced.

When routing packets directly to the mobile node, the correspondent node sets the Destination Address in the IPv6 header to the care-of address of the mobile node. The IPv6 routing header is also added to the packet to carry the desired home address. Similarly, the mobile node sets the Source Address in the packet's IPv6 header to its current care-of addresses. Including the MN's home address in these packets makes the use of the care-of address transparent above the network layer (e.g., at the transport layer).

Mobile IPv6 also provides support for multiple home agents, and the reconfiguration of the home network. In these cases, the mobile node may not know the IP address of its own home agent, and even the home subnet prefixes may change over time. A mechanism, known as "dynamic home agent address discovery" allows a mobile node to dynamically discover the IP address of a home agent on its home link, even when the mobile node is away from home. Mobile nodes can also learn new information about home subnet prefixes through the "prefix discovery" mechanism. The communication between the home agent and the mobile node may be secured by standard IP Security Protocol (IPSec)/Encapsulating Security Payload (ESP) means. For further information, please refer to RFC 2406, which is hereby incorporated by reference.

For global reachability, Mobile IP uses a non-changing or infrequently changing Home Address that is a globally routable unicast address. This home address is generally published through a DNS in order to allow peers to always reach a MN. Home Addresses are assigned either through stateless autoconfiguration or via DCHP, or by other configuration means (e.g. manual configuration, out of band configuration such as PDP creation, etc.). If stateless autoconfiguration is used for home address, the privacy procedures of RFC 3041 are applicable with the same limitations as explained above.

When a mobile node leaves its home link and arrives at a new one, it configures a care of address that it registers with its home agent through a binding update message. This message contains both the addresses, Care of Address as a source and the Home Address as a destination option encrypted within a privacy label. The privacy label is supplied by the mobile node to the correspondent node in a way that that allows the privacy label to be bound to the home address, but does not allow the home address to be visible during the exchange. Even though a passive attacker could monitor the traffic between the visited network and the home network, the binding updates to the home agent are protected from traffic analysis by sending the binding update messages in an IPSec/EPS protected tunnel.

Moreover, all the traffic between the mobile node and the correspondent node carry both the current Care of Address and the Home Address in a privacy label making the correlation of a Home Address and a Care of Address non-trivial.

The privacy label also reduces the additional vulnerability that the location of a mobile node through traffic analysis could be determined. This is because both the Home Address and the Care of Address are hidden in a privacy label in the binding update message and in all the packets that are exchanged after the binding is set up with a Mobile Node and a Correspondent Node.

Figure 2:
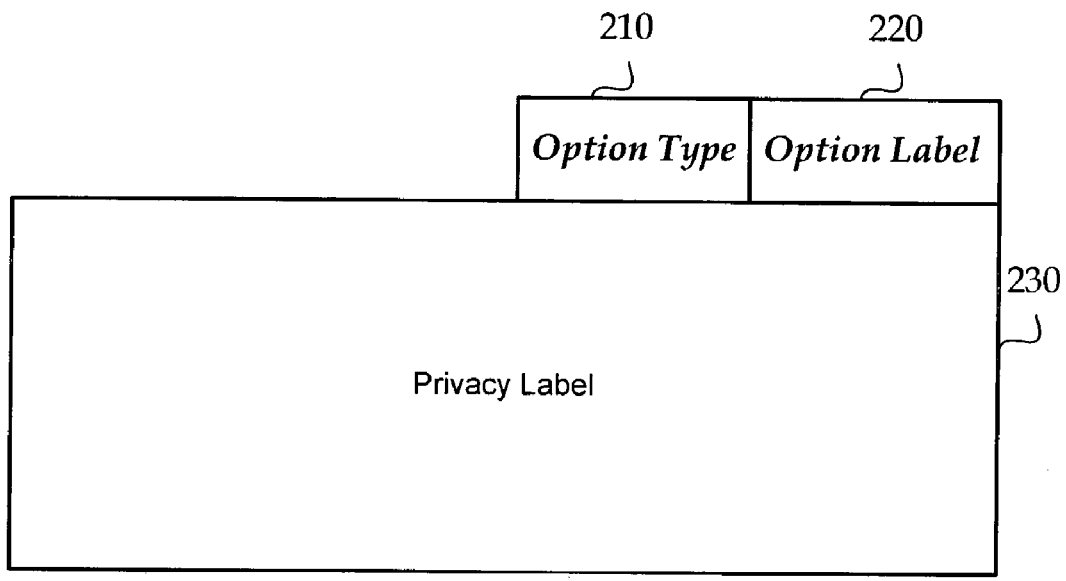
FIG. 2 illustrates an exemplary privacy label.

FIG. 2 illustrates an exemplary privacy label. As shown in the figure, the header includes an option type 210, an option label 220, and a privacy label 230. In the current mobile IPv6 specification if route optimization is used, the care of address and the home address of the mobile node are carried in Home Address Option and in Router Header Type 2 in clear, which makes the protocol vulnerable for traffic analysis and traffic correlation that can compromise location privacy of a mobile node.

According to the present invention, the mobile node hides the true Home Address in the Home Address option element towards the correspondent nodes and the correspondent nodes does not use plain text Home Addresses in the Routing Headers. The proposed method for hiding the home address thwarts the correlation of the care of address and home address by an outsider observer. Instead of the home address a "privacy label" (230) that is cryptographically created from the home address is used. This privacy label is supplied by the mobile node to the correspondent node in a way that allows the privacy label to be bound to the home address but does not allow the home address to be visible during the exchange.

The privacy label can be used within a modified routing header, to avoid use of a clear text home address for packets sent to the mobile node's care-of address. Similarly, the mobile node can use the privacy label within a modified Home Address Option, to identify its desired home address to the correspondent node without public disclosure.

According to one embodiment of the invention, the privacy label is supplied by the mobile node to the correspondent node within an extension to the Binding Update to the correspondent node.

If the Correspondent Node does not support the privacy label it may send back a parameter problem ICMP error message as normal IPv6 stack behavior. Based on this the sending Mobile Node is able to revert back to use non-protected home address option or cease communication.

Figure 3:
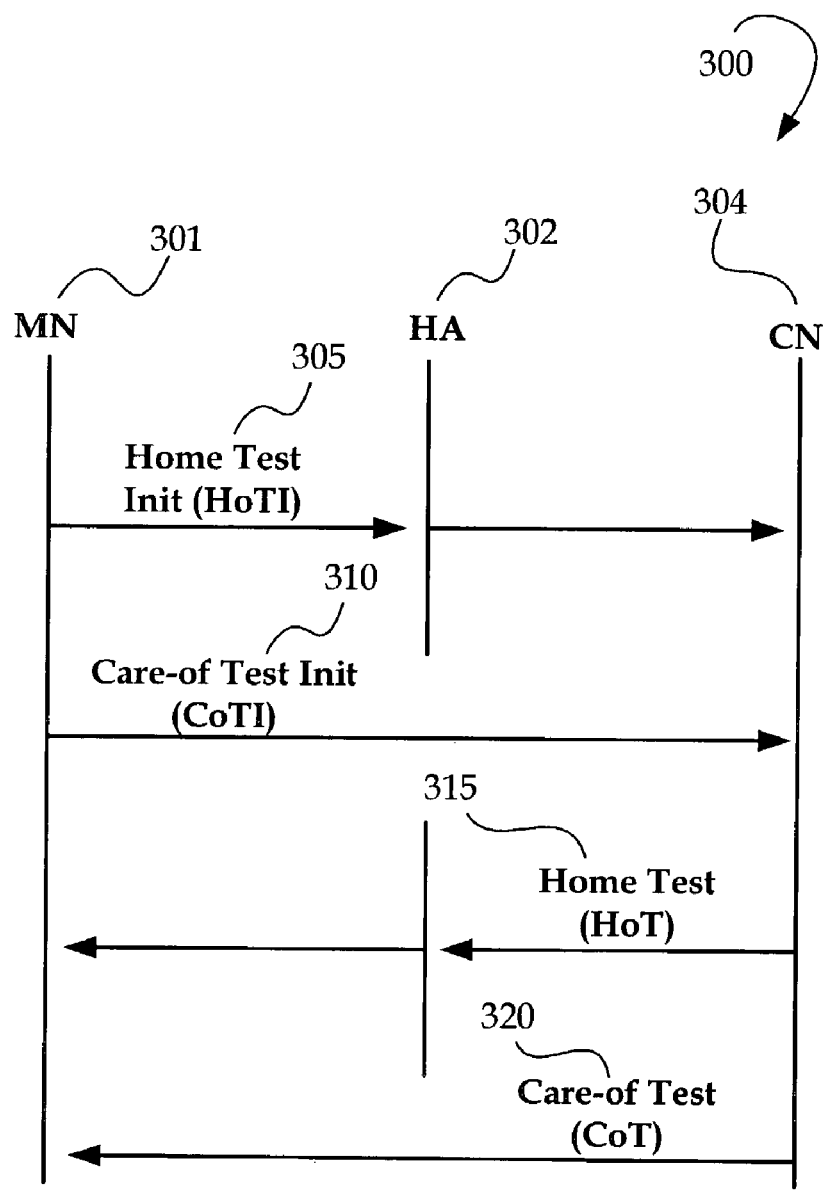
FIG. 3 illustrates a Return Routability Procedure.

FIG. 3 illustrates a Return Routability Procedure, in accordance with aspects of the invention. The Return Routability Procedure enables the correspondent node (304) to obtain some reasonable assurance that the mobile node (301) is in fact addressable at its claimed care-of address as well as at its home address. Only with this assurance is the correspondent node able to accept Binding Updates from the mobile node which would then instruct the correspondent node to direct that mobile node's data traffic to its claimed care-of address.

This is done by testing whether packets addressed to the two claimed addresses are routed to the mobile node. The mobile node can pass the test only if it is able to supply proof that it received certain data (the "keygen tokens") which the correspondent node sends to those addresses. These data are combined by the mobile node into a binding management key, denoted Kbm.

The Home Test Init (HoTI) (305) and Care-of Test Init (CoTI) (310) messages are sent at the same time. The procedure requires very little processing at the correspondent node, and the Home and Care-of Test messages can be returned quickly, perhaps nearly simultaneously. These four messages form the return routability procedure.

1) Home Test Init (305) Message

A mobile node sends a Home Test Init message (305) to the correspondent node (304) to acquire the home keygen token. The contents of the message can be summarized as follows:
Source Address=home address
Destination Address=correspondent
Parameters:
home init cookie The Home Test Init message conveys the mobile node's home address to the correspondent node. The mobile node also sends along a home init cookie that the correspondent node must return later. The Home Test Init message is reverse tunneled through the home agent (302). The mobile node remembers these cookie values to obtain some assurance that its protocol messages are being processed by the desired correspondent node.

2) Care-of Test Init Message (310)

The mobile node (301) sends a Care-of Test Init message (310) to the correspondent node (304) to acquire the care-of keygen token. The contents of this message can be summarized as follows:
Source Address=care-of address
Destination Address=correspondent
Parameters:
care-of init cookie The Care-of Test Init message conveys the mobile node's care-of address to the correspondent node. The mobile node also sends along a care-of init cookie that the correspondent node must return later. The Care-of Test Init message is sent directly to the correspondent node.

3) Home Test Message (HoT) (315)

The Home Test message (315) is sent in response to a Home Test Init message (305). The contents of the message can be summarized as follows:
Source Address=correspondent
Destination Address=home address
Parameters:
home init cookie
home keygen token
home nonce index When the correspondent node receives the Home Test Init message, it generates a home keygen token as follows:
home keygen token :=First (64, HMAC_SHA1 (Kcn, (home address|nonce|0))) where | denotes concatenation. The final "0" inside the HMAC_SHA1 function is a single zero octet, used to distinguish home and care-of cookies from each other. The home keygen token is formed from the first 64 bits of the MAC. The home keygen token tests that the mobile can receive messages sent to its home address. Kcn is used in the production of home keygen token in order to allow the correspondent node to verify that it generated the home and care-of nonces, without forcing the correspondent node to remember a list of all tokens it has handed out. The Home Test message (315) is sent to the mobile node via the home network, where it is presumed that the home agent will tunnel the message to the mobile node. This means that the mobile node needs to already have sent a Binding Update to the home agent, so that the home agent will have received and authorized the new care-of address for the mobile node before the return routability procedure. For improved security, the data passed between the home agent and the mobile node can be made immune to inspection and passive attacks. Such protection can be gained by encrypting the home keygen token as it is tunneled from the home agent to the mobile node. Additional security may be provided as discussed in RFCs 2401 and 2406 relating to the subject, which are hereby incorporated by reference. The home init cookie from the mobile node is returned in the Home Test message, to ensure that the message comes from a node on the route between the home agent and the correspondent node. The home nonce index is delivered to the mobile node to later allow the correspondent node to efficiently find the nonce value that it used in creating the home keygen token.

Care-of Test (CoT) Message (320)

This message is sent in response to a Care-of Test Init message (310). The contents of the message may be summarized as follows:

Source Address=correspondent
Destination Address=care-of address
Parameters:
    care-of init cookie
    care-of keygen token
    care-of nonce index When the correspondent node receives the Care-of Test Init message, it generates a care-of keygen token as follows:

care-of keygen token :=First (64, HMAC_SHA1 (Kcn, (care-of address|nonce|1))). Here, the final "1" inside the HMAC_SHA1 function is a single octet containing the hex value 0x01, and is used to distinguish home and care-of cookies from each other. The keygen token is formed from the first 64 bits of the MAC, and sent directly to the mobile node at its care-of address. The care-of init cookie from the from Care-of Test Init message is returned to ensure that the message comes from a node on the route to the correspondent node. The care-of nonce index is provided to identify the nonce used for the care-of keygen token. The home and care-of nonce indices may be the same, or different, in the Home and Care-of Test messages.

When the mobile node has received both the Home and Care-of Test messages, the return routability procedure is complete. As a result of the procedure, the mobile node has the data it needs to send a Binding Update to the correspondent node. The mobile node hashes the tokens together to form a 20 octet binding key Kbm:

Kbm=SHA1 (home keygen token|care-of keygen token)

A Binding Update may also be used to delete a previously established binding. In this case, the care-of keygen token is not used. Instead, the binding management key is generated as follows:

Kbm=SHA1(home keygen token)

Note that the correspondent node does not create any state specific to the mobile node, until it receives the Binding Update from that mobile node. The correspondent node does not maintain the value for the binding management key Kbm; it creates Kbm when given the nonce indices and the mobile node's addresses.

Figure 4:
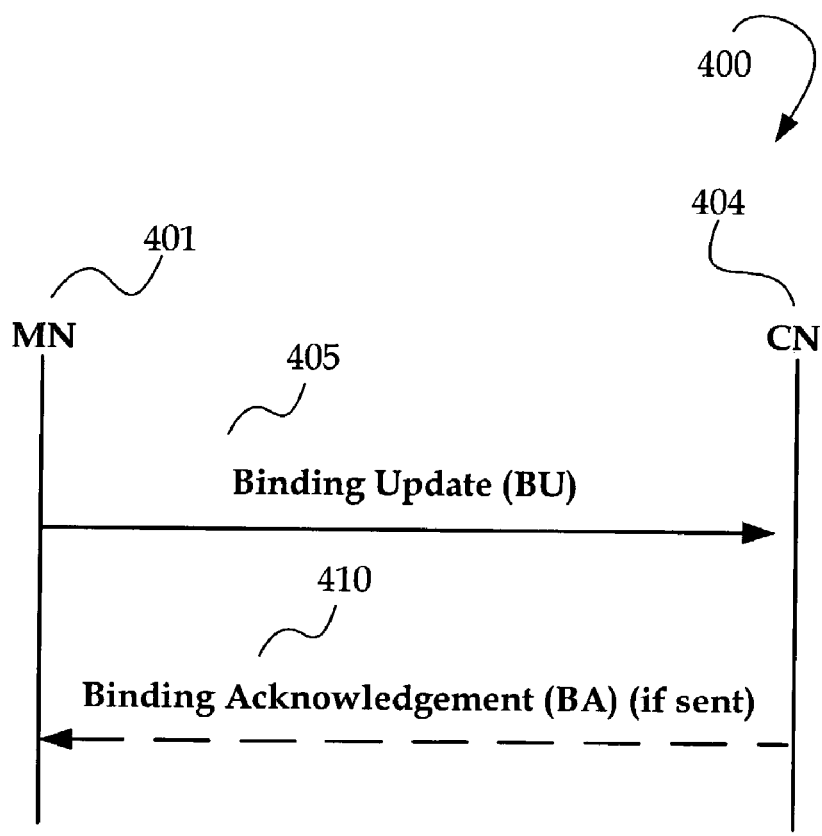
FIG. 4 illustrates an exemplary Binding Update (BU)

FIG. 4 illustrates an exemplary Binding Update (BU) 400, in accordance with aspects of the invention.

After the mobile node (401) has created the binding management key (Kbm), it can supply a verifiable Binding Update (405) to the correspondent node (404). This section provides an overview of this binding procedure. To authorize a Binding Update, the mobile node creates a binding management key Kbm from the keygen tokens as described earlier. The contents of the Binding Update include the following:

Source Address=care-of address
Destination Address=correspondent
Parameters:
    home address (within the Home Address destination option if different from the Source Address)
    sequence number (within the Binding Update message header)
    home nonce index (within the Nonce Indices option)
    care-of nonce index (within the Nonce Indices option)
    HMAC_SHA1 (Kbm, (care-of address|CN address|BU))

The Binding Update contains a Nonce Indices option, indicating to the correspondent node which home and care-of nonces to use to recompute Kbm, the binding management key. The MAC is computed using the correspondent node's address as the destination address and the Binding Update message itself as the Mobility Header Data. Once the correspondent node has verified the MAC, it can create a Binding Cache entry for the mobile.

Binding Acknowledgement (BA) Message (410)

The Binding Update is in some cases acknowledged by the correspondent node. The contents of the message are as follows:

Source Address=correspondent
Destination Address=care-of address
Parameters:
    sequence number (within the Binding Update message header)
    HMAC_SHA1 (Kbm, (care-of address|CN address|BA))

The Binding Acknowledgement contains the same sequence number as the Binding Update. The MAC is computed using the correspondent node's address as the destination address and the message itself as the Mobility Header Data.

Bindings established with correspondent nodes using keys created by way of the return routability procedure must not exceed a predetermined time period. The value in the Source Address field in the IPv6 header carrying the Binding Update is normally also the care-of address which is used in the binding. However, a different care-of address MAY be specified by including an Alternate Care-of Address mobility option in the Binding Update. When such a message is sent to the correspondent node and the return routability procedure is used as the authorization method, the Care-of Test Init and Care-of Test messages must have been performed for the address in the Alternate Care-of Address option (not the Source Address). The nonce indices and MAC value are based on information gained in this test.

Binding Updates may also be sent to delete a previously established binding. In this case, generation of the binding management key depends exclusively on the home keygen token and the care-of nonce index is ignored.

Figure 5:
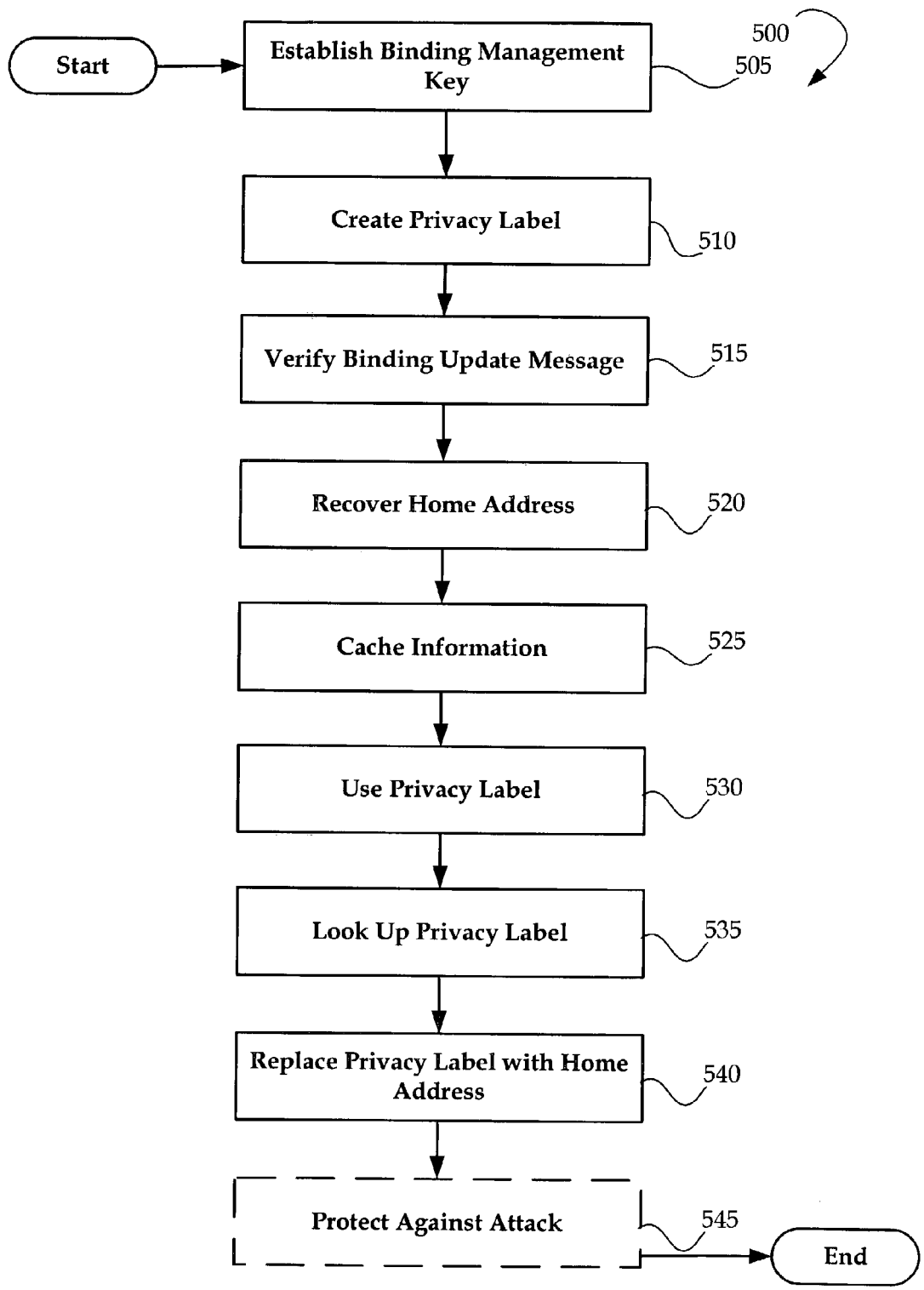
FIG. 5 illustrates a method for providing privacy to nodes using a privacy label.

FIG. 5 illustrates a method for providing privacy to nodes using a privacy label in accordance with aspects of the invention. After a start block, the process flows to block 505 where a Binding Management Key (Kbm) is established. After successful execution of Return Routability procedure (See FIG. 3 and related discussion) for binding authorization both the mobile node and the correspondent node have established a binding management key, Kbm. This key is used to create the privacy label and hide the home address in the Binding Update message extension.

Moving to block 510, a privacy label is created. According to one embodiment, the privacy label carried in the Binding Update message and in the subsequent route optimized traffic is constructed as follows:

Privacy Label=MAC_Kbm XOR "string" where "string" is (home address∥current care of address) where "∥" denotes concatenation; and MAC_Kbm denotes HMAC_SHA1 [hmac] computed on the binding update message, starting at the mobility header till the end of the packet, with binding management key, Kbm.

Mechanisms that provide such integrity check based on a secret key are usually called "message authentication codes" (MAC). Typically, message authentication codes are used between two parties that share a secret key in order to validate information transmitted between these parties. HMAC is a mechanism for message authentication using cryptographic hash functions. HMAC can be used with any iterative cryptographic hash function, e.g., MD5, SHA-1, in combination with a secret shared key. The cryptographic strength of HMAC depends on the properties of the underlying hash function. The definition of HMAC requires a cryptographic hash function, which is denoted by H, and a secret key K. H is assumed to be a cryptographic hash function where data is hashed by iterating a basic compression function on blocks of data. B denotes the byte-length of such blocks (B=64 for all the above mentioned examples of hash functions), and by L the byte-length of hash outputs (L=16 for MD5, L=20 for SHA-1). The authentication key K can be of any length up to B, the block length of the hash function. Applications that use keys longer than B bytes will first hash the key using H and then use the resultant L byte string as the actual key to HMAC. In any case the minimal recommended length for K is L bytes (as the hash output length). Two fixed and different strings ipad and opad are defined as follows (the 'i' and 'o' are mnemonics for inner and outer): ipad=the byte 0x36 repeated B times; opad=the byte 0x5C repeated B times. To compute HMAC over the data 'text' the following equation is performed: H(K XOR opad, H(K XOR ipad, text)). Namely, (1) append zeros to the end of K to create a B byte string (e.g., if K is of length 20 bytes and B=64, then K will be appended with 44 zero bytes 0x00)

(2) XOR (bitwise exclusive-OR) the B byte string computed in step (1) with ipad (3) append the stream of data 'text' to the B byte string resulting from step (2)

(4) apply H to the stream generated in step (3)

(5) XOR (bitwise exclusive-OR) the B byte string computed in step (1) with opad (6) append the H result from step (4) to the B byte string resulting from step (5)

(7) apply H to the stream generated in step (6) and output the result. For a more complete definition of HMAC please refer to H. Krawczyk, M. Bellare, and R. Canetti. HMAC: Keyed-Hashing for Message Authentication. Request for Comments (Informational) 2104, Internet Engineering Task Force, February 1997.

Transitioning to block 515, the Correspondent Node (CN) Verifies the Binding Update Message. The correspondent node first verifies the MAC of the Binding Update message, and uses the same MAC to recover the "string."

"string"=MAC_Kbm XOR Privacy label

Moving to block 520, the home address of the mobile node is recovered. From the string, the CN recovers the original home address of the mobile node.

Flowing to block 525, the information is cached in the privacy label cache. Once the home address is recovered, the CN caches this information in a Privacy Label cache. According to one embodiment, the Privacy Label cache is a table of entries used by the IP protocol stack. Each entry in the data structure contains a mapping between the privacy label and the home address. The MN also stores this information in its Privacy Label cache.

Moving to block 530, the privacy label is used. The correspondent node uses the privacy label in the routing header in place of the true home address for each data packet. Similarly the mobile node uses the privacy label in the home address option instead of the actual home address.

Flowing to block 535, the privacy label is looked up. When the CN receives a data packet with a privacy label option, it looks up the Privacy Label Cache using the privacy label as the key for the lookup.

Next, at block 540, the Privacy Label is replaced with the Home Address. The node replaces the privacy label in the received packet with the home address found through the lookup. The packet is then processed as a normal mobile IPv6 packet.

Flowing to optional block 545, further security may be added to protect against Replay Attacks. To add further security beyond the return routability procedure of mobile IPv6 specification the method is augmented to provide protection against replay attacks. According to one embodiment, this is achieved by adding a sequence number into the privacy label calculation: privacy label=MAC_Kbm XOR "string", where "string"=(home address∥current care of address∥sequence number) and "∥" denotes concatenation. The sequence number is initialized from the binding update message that is creating the binding and incremented each time when a new packet is sent with a privacy label. The sequence number is stored in the Privacy Label Cache of the correspondent node together with the home address and the privacy label. Each time the corresponding binding is renewed with a new binding update a new base for the sequence number is initialized.

Figure 6:
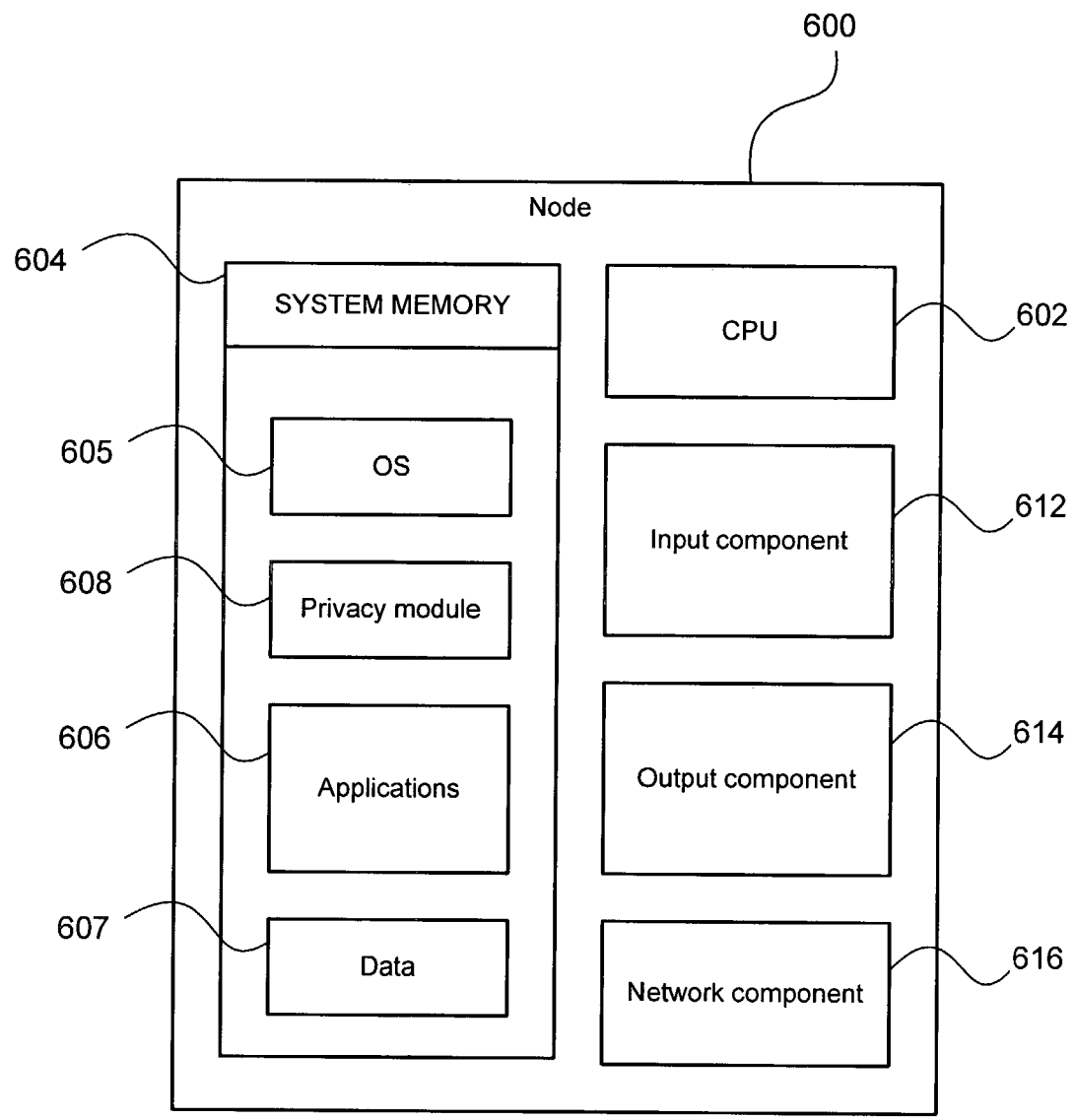
FIG. 6 illustrates an exemplary node that may be used in accordance with aspects of the invention.

FIG. 6 illustrates an exemplary node that may be used in accordance with aspects of the invention. For illustrative purposes, node 600 is only shown with a subset of the components that are commonly found in a computing device. A computing device that is capable of implementing this invention may have more, less, or different components as those shown in FIG. 6. Node 600 may include various hardware components. In a very basic configuration, Node 600 typically includes central processing unit 602, system memory 604, and network component 616.

The node includes a cache, which may bring scalability concerns for servers serving thousands of clients.

Depending on the exact configuration and type of computing device, system memory 604 may include volatile memory, non-volatile memory, data storage devices, or the like. These examples of system memory 604 are all considered computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by node 600. Any such computer storage media may be part of node 600.

Node 600 may include input component 612 for receiving input. Input component 612 may include a keyboard, a touch screen, a mouse, or other input devices. Output component 614 may include a display, speakers, printer, and the like.

Node 600 may also includes network component 616 for communicating with other devices in an IP network. In particular, network component 616 enables node 600 to communicate with mobile nodes and corresponding nodes. Node 600 may be configured to use network component 616 to receive and send packets to and from the corresponding nodes and the mobile nodes.

Signals sent and received by network component 616 are one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Software components of node 600 are typically stored in system memory 604. System memory 604 typically includes an operating system 605, one or more applications 606, and data 607. As shown in the figure, system memory 604 may also include a privacy module 608. Privacy module 608 is a component for creating and processing privacy labels as described above. Privacy module 608 includes computer-executable instructions for performing processes relating to the privacy label.

The above specification, examples and data provide a complete description of the invention. Since many embodiments of the invention can be made without departing from the spirit and scope of the invention, the invention resides in the claims hereinafter appended.

What is claimed is:

1. A method, comprising:
   creating, by an end, mobile node, a privacy label for binding a home address to a care-of-address for the end, mobile node by combining the home address with the care-of-address and a hash, wherein the privacy label hides the home address during an exchange with another node;
   using the privacy label in place of the home address to communicate with the another node, in part, by employing the privacy label in a routing address header of a packet, wherein the packet is a mobile internet protocol binding update; and
   storing the privacy label and the home address in a privacy label cache to associate the privacy label and the home address.

2. The method of claim 1, wherein the privacy label is created using a key, a home address and a current care-of address.

3. The method of claim 2, wherein creating the privacy label further comprises XORing the key with a concatenation of the home address and the current care-of address.

4. The method of claim 2, further comprising using a cryptographic hash function with the key.

5. The method of claim 2, further comprising storing a mapping of the privacy label to the home address.

6. The method of claim 2, further comprising using the privacy label in a home address option.

7. The method of claim 2, further comprising inserting a sequence number into the privacy label to aid in preventing reply attacks.

8. An apparatus, comprising:
   a network interface configured to communicate with one or more nodes;
   a memory configured to store information relating to a privacy label;
   a processor configured to perform actions, including
      creating, by an end, mobile node, a privacy label for binding a home address to a care-of-address for the end, mobile node by combining the home address with the care-of-address and a hash, wherein the privacy label hides a home address during an exchange with another one of the nodes,
      using the privacy label in place of the home address when communicating with the another one of the nodes, in part, by employing the privacy label in a routing address header of a packet, wherein the packet is a mobile internet protocol binding update, and storing the privacy label and the home address in a privacy label cache at the memory.

9. The apparatus of claim 8, wherein the privacy label is created using a key, a home address and a current care-of address.

10. The apparatus of claim 9, wherein creating the privacy label further comprises XORing the key with a concatenation of the home address and the current care-of address.

11. The apparatus of claim 10, further comprising storing a mapping of the privacy label to the home address in the memory.

12. The apparatus of claim 9, further comprising using the privacy label in a home address option.

13. The apparatus of claim 9, further comprising inserting a sequence number into the privacy label to aid in preventing replay attacks.

14. A computer program embodied on a computer readable storage medium, the computer program being configured to control a processor to implement operations comprising:
   creating, by an end, mobile node, a privacy label that binds a home address to a care-of-address for the end, mobile node by combining the home address with the care-of-address and a hash, wherein the privacy label hides the home address during an exchange with another node;
   using the privacy label in place of the home address to communicate with the another node, in part, by employing the privacy label in the routing address header of a packet, wherein the packet is a mobile internet protocol binding update; and
   storing the privacy label and the home address in a privacy label cache to associate the privacy label and the home address.

15. The computer program of claim 14, wherein the privacy label is created using a key a home address and a current care-of address.

16. The computer program of claim 15, wherein the privacy label further comprises XORing the key with a concatenation of the home address and the current care-of address.

17. The computer program of claim 15, the method further comprising using a cryptographic hash function with the key.

18. The computer program of claim 15, the method further comprising inserting a sequence number in the privacy label to aid in preventing replay attacks.

19. The computer program of claim 14, the method further comprising using the privacy label in a home address option.

* * * * *